(Model.)
J. H. BABBITT.
Vehicle-Seat.
No. 226,956. Patented April 27, 1880.
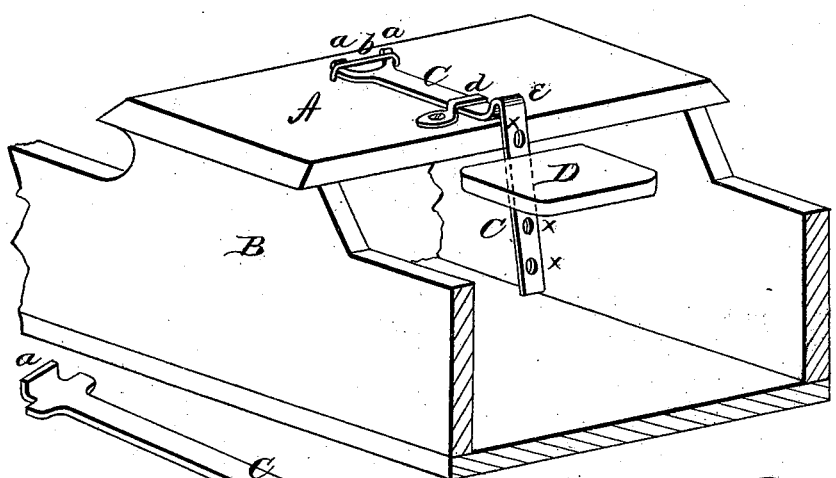
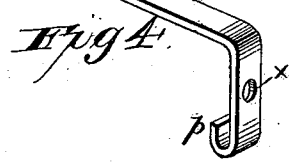
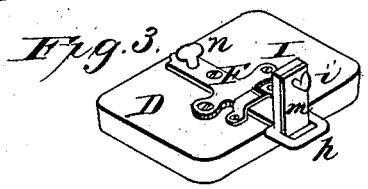
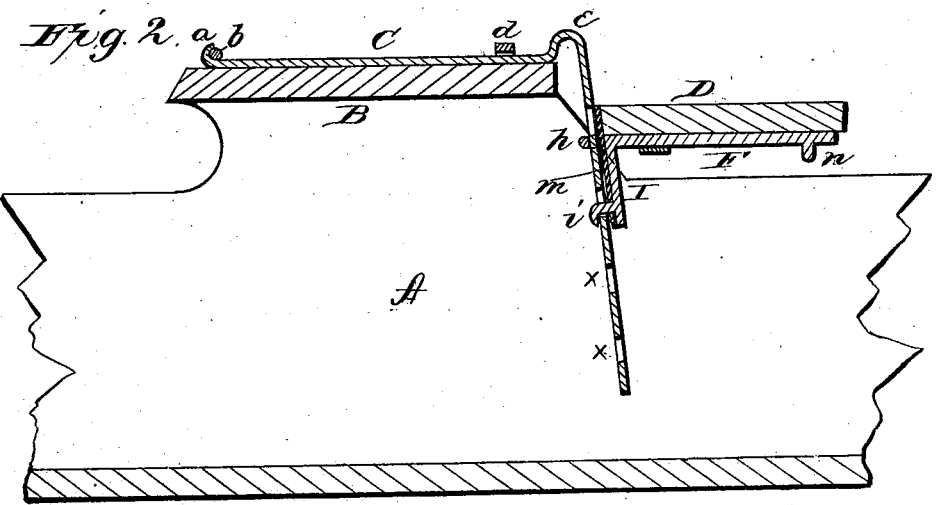
Witnesses:
F. L. Ouraud
H. Aubrey Toulmin
Inventor:
James H. Babbitt
By Alexander Matre

UNITED STATES PATENT OFFICE.

JAMES H. BABBITT, OF OAK FOREST, PENNSYLVANIA.

VEHICLE-SEAT.

SPECIFICATION forming part of Letters Patent No. 226,956, dated April 27, 1880.

Application filed March 1, 1880. (Model.)

*To all whom it may concern:*

Be it known that I, JAMES H. BABBITT, of Oak Forest, in the county of Greene, and in the State of Pennsylvania, have invented certain new and useful Improvements in Auxiliary Vehicle-Seats; and I do hereby declare that the following is a full, clear, and exact description thereof, reference being had to the accompanying drawings, and to the letters of reference marked thereon, making a part of this specification.

The nature of my invention consists in the construction and arrangement of devices for attaching an auxiliary seat to the ordinary seat of a vehicle, as will be hereinafter more fully set forth.

In order to enable others skilled in the art to which my invention appertains to make and use the same, I will now proceed to describe its construction and operation, referring to the annexed drawings, in which—

Figure 1 is a perspective view of a vehicle-body with seat and my auxiliary seat applied thereto. Fig. 2 is a longitudinal vertical section of the same. Fig. 3 is a bottom perspective view of the auxiliary seat. Fig. 4 is a perspective view of a supporting-bar.

A represents an ordinary vehicle-seat supported on the body B.

C represents an L-shaped bar, one arm of which is held in the center on top of the seat A, while the other arm hangs down in front. The end of the upper arm is formed with one or two hooked prongs, $a$, which fit under a staple, $b$, firmly fastened on the seat A. A button, $d$, pivoted on the seat, is then turned over the bar, as shown in Fig. 1, thereby holding the bar C in place.

The forward arm of the bar C has a series of holes, $x x$, made through it for adjusting the auxiliary seat up or down as required, so as to adapt the same either for a child or an adult.

At the angle the L-shaped bar may be turned upward slightly and then downward, so as not to injure the edge of the seat, this bend being shown at $e$.

D represents the auxiliary seat, provided on its under side with a metal plate, F, which extends in rear of the seat and forms an eye, $h$, of sufficient size to pass over the vertical arm of the bar C.

The plate F has near its rear end a downwardly-extending arm, I, on which is a projecting hook, $i$.

When the eye $h$ has been passed from the lower end over the bar C the hook $i$ may be inserted in any one of the holes $x$, and thus hold the seat D in place, and the seat can be easily moved up or down to adjust it to suit the person using the same.

The rear side of the arm I is provided with a lining, $m$, of leather or other suitable material, to prevent unpleasant noise, which would be occasioned by metal coming against metal.

When the auxiliary seat is not in use it may be hung by means of a T-head, $n$, projecting from the plate F, which may be passed through one of the holes $x$, the rear edge of the seat hanging downward. When no adjustment of the seat is required the downward arm of the bar C may be made shorter, as shown in Fig. 4, and only have one hole $x$ for the hook $i$, and the lower end of said arm then forms a hook, $p$, for the seat to hang on when not in use.

Instead of only one plate, F, in the center of the auxiliary seat D, I may use one near each end, and then also two supporting-bars, C, on the main seat.

Having thus fully described my invention, what I claim as new, and desire to secure by Letters Patent, is—

1. The removable L-shaped bar C, having at one end one or more hooks, $a$, and the other arm provided with one or more holes, $x$, in combination with the main seat A, staple $b$, button $d$, and auxiliary seat D, substantially as and for the purposes herein set forth.

2. The seat D, provided with the metal plate F, having eye $h$, and arm I, with hook $i$, in combination with the bar C, substantially as and for the purposes herein set forth.

In testimony that I claim the foregoing I have hereunto set my hand this 21st day of February, 1880.

JAMES H. BABBITT.

Witnesses:
JNO. AIKEN,
ALVAN DONNAN.